(12) United States Patent
Furuya

(10) Patent No.: US 6,864,949 B2
(45) Date of Patent: Mar. 8, 2005

(54) METHOD OF MANUFACTURING FLAT DISPLAY ELEMENT

(75) Inventor: Hiroaki Furuya, Ageo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 113 days.

(21) Appl. No.: 10/186,699

(22) Filed: Jul. 2, 2002

(65) Prior Publication Data

US 2003/0007119 A1 Jan. 9, 2003

(30) Foreign Application Priority Data

Jul. 5, 2001 (JP) ........................................ 2001-204600

(51) Int. Cl.[7] ........................................... G02F 1/1339
(52) U.S. Cl. ....................... 349/190; 349/158; 349/135
(58) Field of Search ................................. 349/190, 158, 349/135, 153

(56) References Cited

U.S. PATENT DOCUMENTS 5,767,827 A * 6/1998 Kobayashi et al. ........... 345/87
6,542,215 B2 * 4/2003 Lee et al. .................... 349/153
6,614,502 B2 * 9/2003 Shinohara et al. ........... 349/187
2001/0006409 A1 * 7/2001 Lee ............................. 349/156
2001/0046026 A1 * 11/2001 Suginoya .................... 349/158
2003/0051812 A1 * 3/2003 Sotozaki et al. ........ 156/345.12

FOREIGN PATENT DOCUMENTS

JP  2001-13489  1/2001

* cited by examiner

Primary Examiner—Jared J. Fureman
Assistant Examiner—Allyson N Trail
(74) Attorney, Agent, or Firm—Oblon, Spivak, McClelland, Maier & Neustadt, P.C.

(57) ABSTRACT

In a method of manufacturing a flat display element, an electrode pattern is formed on each of a pair of substrates, and a product seal surrounding the electrode pattern and an outside seal having an air vent and surrounding the outside of the product seal are formed on one of the substrates. A gap retaining member for maintaining a gap between the substrates in the region of the air vent is formed outside the product seal and near the air vent. The paired substrates are pressurized after they are stuck together with the product seal and the outside seal between them. Thereafter, the air vent is sealed with a sealing agent, and the outer surface of at least one of the substrates is polished.

8 Claims, 3 Drawing Sheets

METHOD OF MANUFACTURING FLAT DISPLAY ELEMENT

This application is based upon and claims the benefit of priority from the prior Japanese Patent Application No. 2001-204600, filed Jul. 5, 2001, the entire contents of which are incorporated herein by reference.

BACKGROUND OF THE INVENTION

1. Field of the Invention

The present invention relates to a method of manufacturing a flat display element having a pair of substrates opposed to each other.

2. Description of the Related Art

A known flat display element comprises a pair of substrates, formed individually of glass substrates or the like and opposed to each other, and an optical modulation layer such as a liquid crystal layer sealed in the gap between the substrates. Since flat display elements of this type are thin and lightweight, they can be widely used in various fields. These days, the flat display elements are expected to be thinner and lighter in weight. The flat display elements can be reduced in thickness and weight by thinning the substrates.

To attain this, a configuration may be proposed such that switching elements, pixel electrodes, opposite electrodes, etc. are formed on thin glass substrates that are thinner than conventional substrates. In this case, however, the respective heights of stages in various manufacturing apparatuses must be adjusted according to the thickness of the glass substrates, so that the manufacturing apparatuses require alteration, thus entailing increase in manufacturing cost. Besides, the thin glass substrates are hard to handle. If the glass substrates become thinner, the extent of their warp or deflection and their liability to deformation attributable to change of temperature increase, so that the productivity of flat display elements is lowered.

It is hard and costs high, moreover, to obtain thin glass substrates of desired large sizes. Further, large-sized glass substrates bend deep as they are transported between the manufacturing apparatuses in manufacturing processes, and may touch the apparatuses and be cracked, thereby considerably lowering the yield of production. Thus, the reduction of the thickness of the glass substrates and the enlargement of the mother glass size are limited.

In order to reduce the thickness and weight of the substrates without entailing higher cost and without failing to maintain high yield of production, a flat display element has been developed that has thinned glass substrates, as disclosed in Jpn. Pat. Appln. KOKAI Publication No. 2002-13489. The display element is manufactured as follows. First, a pair of electrode substrates are prepared. The electrode substrates include glass substrates having a conventional thickness and switching elements, pixel electrodes, an opposed electrode, etc. are formed on the glass substrates. These electrode substrates are opposed to each other to form a display cell. Then, the outer surfaces of the glass substrates are polished by mechanical or chemical etching, thereby obtaining a flat display element having thinned glass substrates.

In manufacturing the flat display element by a multi-manufacturing method, two mother glasses are prepared. One mother glass is formed having a plurality of electrode patterns and product seals surrounding the patterns, and the other mother glass having a plurality of electrode patterns. Further, an outer peripheral seal is formed extending along the peripheral edge of the one mother glass. A liquid crystal inlet and an air vent are formed in advance in each product seal and the outer peripheral seal, respectively. The two mother glasses are stuck together with the outer peripheral seal and the product seals between them. After the mother glasses are then pressurized so that air is discharged through the air vent, a sealing agent is sucked into the air vent to seal it with the mother glasses held parallel to each other. Thereafter, the respective outer surfaces of the mother glasses are polished.

According to the conventional manufacturing method, however, the gap between the mother glasses becomes too narrow at the region corresponding to the air vent when the mother glasses are stuck together and pressurized for the air discharge. Accordingly, there is the possibility of the sealing agent failing to be sufficiently sucked into the air vent. If the respective outer surfaces of the mother glasses are polished without completely sealing the air vent with the sealing agent, an abrasive or etchant inevitably gets into the gap between the mother glasses through the air vent. In the case of chemical polishing, in particular, the etchant between the mother glasses inevitably etches the inner surfaces of the glasses, so that those regions of the glass substrate which are touched by the etchant become extremely thin. In consequence, the glass substrates are easily cracked or chipped.

The abrasive or etchant that is forced into the gap between the mother glasses through the air vent further gets into regions for the formation of electrode patterns through the liquid crystal inlet, possibly exerting a very bad influence upon the display quality level of the flat display element.

BRIEF SUMMARY OF THE INVENTION

The present invention has been contrived in consideration of these circumstances, and its object is to provide a method of manufacturing a flat display element, capable of manufacturing a thin, lightweight liquid crystal display element without entailing increase in cost or lowering the yield of production or the level of display quality.

In order to achieve the above object, a manufacturing method according to an aspect of the invention comprises: preparing a pair of substrates; forming an electrode pattern on each substrate; forming on one of the substrates a product seal surrounding the electrode pattern and an outside seal having an air vent and surrounding the outside of the product seal; forming a gap retaining member for maintaining a gap between the substrates in the region of the air vent outside the product seal and near the air vent; sticking the pair of substrates together with the product seal and the outside seal between the substrates after the gap retaining member is formed; pressurizing the substrates after the substrates are stuck together; sealing the air vent with a sealing agent after the air is discharged; and polishing the outer surface of at least one of the substrates after the air vent is sealed.

A manufacturing method according to another aspect of the invention comprises: preparing a pair of substrates; forming an electrode pattern on each substrate; forming on one of the substrates a product seal surrounding the electrode pattern and an outside seal having an air vent and surrounding the outside of the product seal; forming a gap retaining member for maintaining a gap between the substrates in the region of the air vent outside the product seal and near the air vent; sticking the pair of substrates together with the product seal and the outside seal between the substrates after the gap retaining member is formed; pressurizing the substrates after the substrates are stuck together; cutting off that side edge portion of at least one of the stuck substrates which adjoins the air vent outside the outside seal; sealing the air vent with a sealing agent after the side edge portion is cut off; and polishing the outer surface of at least one of the substrates after the air vent is sealed.

According to the manufacturing method arranged in this manner, the sealing agent can be satisfactorily sucked into the air vent in the outside seal to seal the vent securely. Thus, an abrasive or etchant can be securely prevented from getting into the display element through the air vent, and the respective inner surfaces of the substrates can be prevented from being cracked or chipped by etching, so that the productivity can be improved. Further, the abrasive, etchant, or the like can be securely prevented from getting into display regions, so that the display quality level of the flat display element can be prevented from lowering.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

DETAILED DESCRIPTION OF THE INVENTION

A method of manufacturing a flat display element according to an embodiment of the present invention will now be described in detail with reference to the accompanying drawings. A liquid crystal display element will be described as an example of the flat display element manufactured by the manufacturing method of the embodiment.

Figure 1:
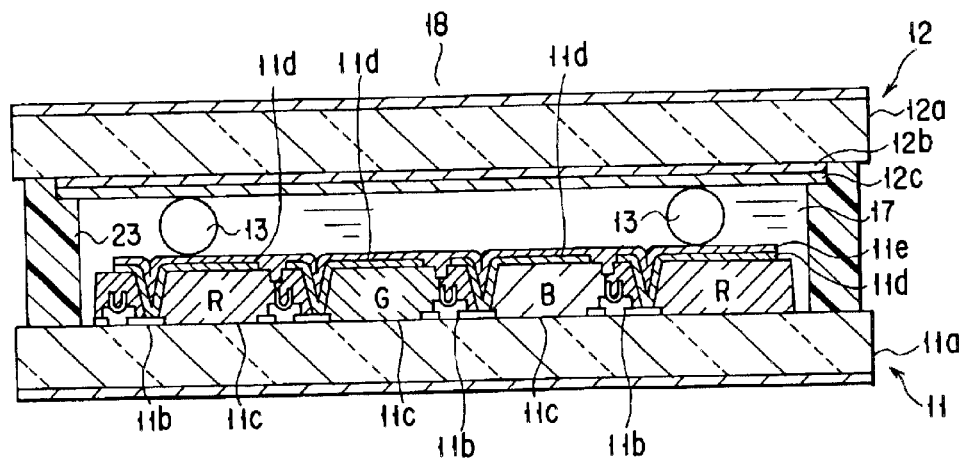
FIG. 1 is a sectional view showing an example of a liquid crystal display element manufactured in a manufacturing method according to the invention.

As shown in FIG. 1, a liquid crystal display element 18 is a laminar display element measuring 221.7 mm by 169.5 mm and having a diagonal dimension of 10.4 inches and a thickness of 1.0 mm. The display element 18 comprises an array substrate 11 and an opposite substrate 12, the respective peripheral edge portions of which are stuck together with product seals 23 between them so that the substrates face each other across a fixed gap.

The array substrate 11 has a glass substrate 11a with a thickness of about 0.5 mm, and thin-film transistors (hereinafter referred to as TFT) 11b, color filter layer 11c, pixel electrodes 11d having a matrix pattern, and orientation film 11e are formed on the glass substrate 11a. The opposite substrate 12 has a glass substrate 12a with a thickness of about 0.5 mm, and an opposite electrode 12b and an orientation film 12c are formed on the glass substrate 12a. The array substrate 11 and the opposite substrate 12 are opposed to each other with a plurality of spacers 13 between them, and a liquid crystal layer 17 serving as an optical modulation layer is sealed between these substrates.

Figure 2:
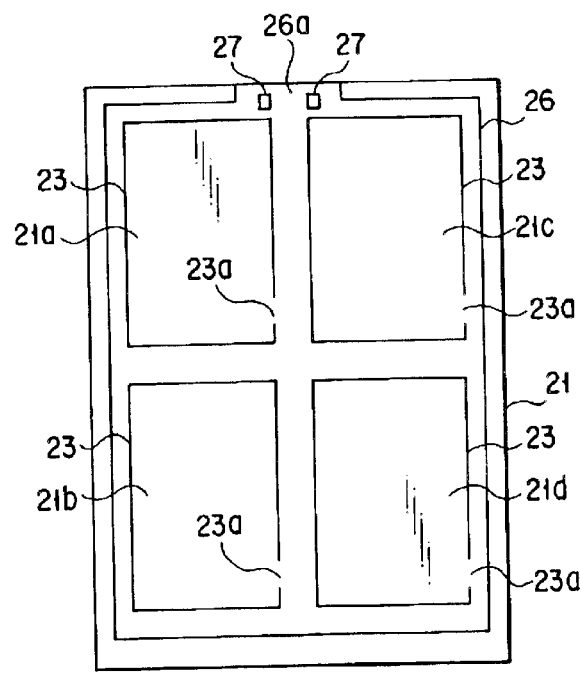
FIG. 2 is a plan view showing electrode patterns and seals formed on a mother glass in a manufacturing method according to a first embodiment of the invention.
Figure 3:
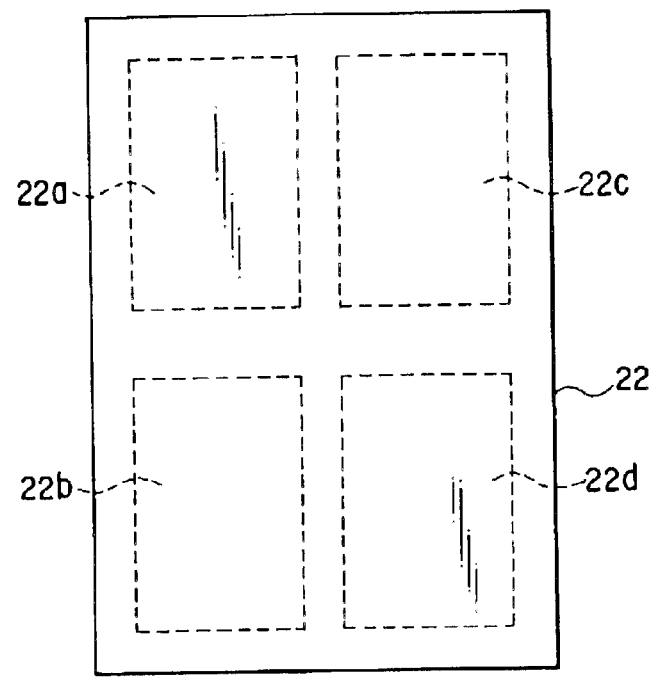
FIG. 3 is a plan view showing electrode patterns formed on another mother glass in the manufacturing method of the first embodiment.

The following is a description of the method of manufacturing the liquid crystal display element 18 constructed in this manner. Mother glasses 21 and 22 measuring 400 mm by 500 mm and having a thickness of 0.7 mm are prepared. As shown in FIGS. 2 and 3, each mother glass has the size which can constitute four array substrates 11 and four opposite substrates 12 of the liquid crystal display element 18 thereon, for example. Four array substrate patterns 21a to 21d in the form of an 800-by-480 dot matrix each are formed on the mother glass 21 by a film-forming technique and photolithography. Each of the array substrate patterns 21a to 21d includes pixel electrodes 11d having a matrix pattern for one electrode substrate, TFTs 11b for driving the pixel electrodes, and plural drive lines for driving the TFTs 11b.

Further, four opposite substrate patterns 22a to 22d are formed on the mother glass 22 by the film-forming technique and photolithography. After the orientation films 11e and 12c are formed on the array substrate patterns 21a to 21d and the opposite substrate patterns 22a to 22d, respectively, they are oriented.

Then, spacers 13 are distributed over the opposite substrate patterns 22a to 22d on the mother glass 22. Further, product seals 23, in the form of a frame each, are formed on the mother glass 21 so as to surround the respective peripheral edges of the array substrate patterns 21a to 21d. The product seals 23 are provided beforehand with inlets 23a, individually, through which a liquid crystal is injected. Each of the substrate patterns 21a to 21d includes connecting terminals (not shown) for electrically connecting the drive lines to a drive integrated circuit (TAB-IC). The connecting terminals are provided on the mother glass 22 and extend to the outside the product seal 23. As well known, when the drive integrated circuit is formed on the substrate by using TFTs, the circuit is arranged inside or outside of the product seal 23. Further, the circuit may be formed with overlapping the product seal 23. The drive integrated circuit constitutes a driving region of each array substrate pattern.

Each product seal 23 is formed by printing or coating of an epoxy-based adhesive by means of a dispenser so that its bond width is about 1.0 mm.

Subsequently, a frame-shaped outer peripheral seal 26 is formed on the peripheral edge portion of the mother glass 21 so as to surround the four array substrate patterns 21a to 21d and the product seals 23. As this is done, the outer peripheral seal 26 is provided with an air vent 26a in its one side portion. Further, the outer peripheral seal 26 is formed by printing or coating of the epoxy-based adhesive by means of the dispenser so that its bond width is about 1.0 mm.

Thereafter, a transfer agent is spread over the respective driving regions of the array substrate patterns 21a to 21d. As this is done, the transfer agent is spread in the form of an island about 5 μm high to form two opening spacers 27, for example, which serve as gap retaining members. Silver paste or the like may be used as the transfer agent.

Figure 4:
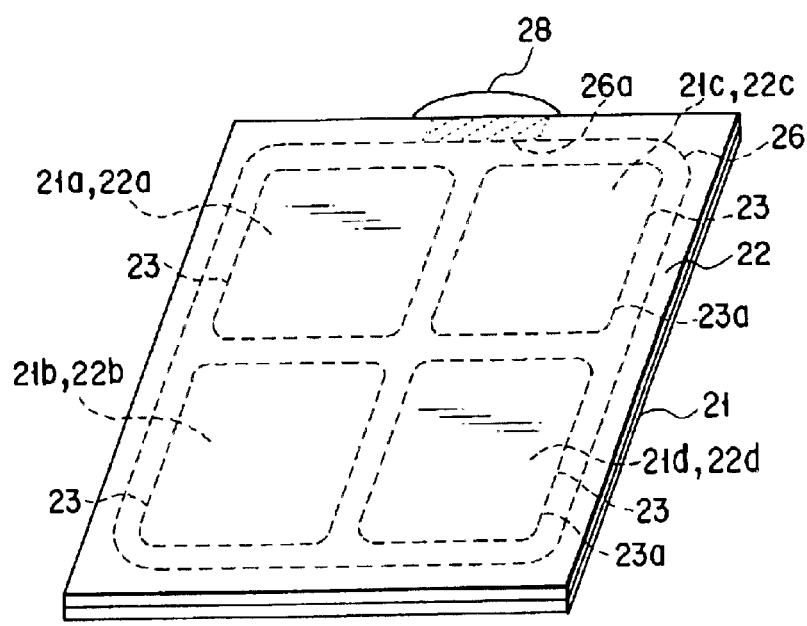
FIG. 4 is a perspective view showing two mother glasses stuck together in the manufacturing method of the first embodiment.

Then, the two mother glasses 21 and 22 are aligned with and opposed to each other and tacked together with a tacking agent which is provided at positions out of the array substrate patterns 21a to 21b, as shown in FIG. 4. Further, the mother glasses 21 and 22 are mechanically pressurized so that a fixed gap is defined between them, and at the same time, surplus air between the glasses 21 and 22 is discharged through the air vent 26a. Thereafter, the mother glasses 21 and 22 are heated, and the product seals 23 and the outer peripheral seal 26 are cured to stick the two mother glasses together.

Further, a plurality of pairs of stuck mother glasses 21 and 22 are superposed and pressurized so that they are in a parallel pressurized state, and a surplus air pool between the glasses is pushed out through the air vent 26a. Subsequently, the glasses 21 and 22 are held upright with the air vent 26a upward, and in this state, a sealing agent 28 is sucked into the air vent 26a to seal it.

Since the opening spacers 27 is provided at the air vent 26a, there is no possibility of the gap between the two mother glasses 21 and 22 becoming too narrow at the region corresponding to the air vent 26a without regard to the pressurization between the glasses 21 and 22 in the glass sticking process and the air removing process. Therefore, the air vent 26a can secure a necessary gap for the suction of the sealing agent 28. Thus, the sealing agent 28 can be satisfactorily sucked into the air vent 26a to seal it securely.

After the gap between the mother glasses 21 and 22 is securely sealed with the outer peripheral seal 26 and the sealing agent 28, the glasses are subjected to chemical polishing, for example. In this case, the stuck mother glasses 21 and 22 are immersed in a fluoric-acid-based etchant in an etching bath (not shown) and are equally polished to a thickness of about 0.5 mm each.

After the polishing, the mother glasses 21 and 22 are quickly washed to be thoroughly cleared of the adhering etchant. Thereafter, the stuck mother glasses 21 and 22 are cut around the product seals 23, and are separated for four display cells. Then, the liquid crystal is injected into a display region surrounded by each product seal 23 through the inlet 23a of each display cell by the vacuum injection method, whereupon the liquid crystal layer 17 is formed. When the inlet 23a is sealed thereafter, the thin, lightweight liquid crystal display element 18 having a thickness of 1.0 mm is completed.

According to the manufacturing method arranged in this manner, the mother glasses are stuck together with the opening spacers 27 formed in the air vent 26a, whereby the vent 26a is prevented from being narrowed. Therefore, the sealing agent 28 can be satisfactorily sucked into the air vent 26a, so that the vent 26a can be sealed securely. Thus, the etchant can be securely prevented from getting into the gap between the mother glasses 21 and 22 through the air vent 26a as the glasses 21 and 22 are polished to thin the glass substrates 11a and 12a. In consequence, the respective inner surfaces of the mother glasses 21 and 22 can be prevented from being etched and cracked or chipped, so that the yield of production of the thin, lightweight liquid crystal display elements 18 can be improved. Further, there is no possibility of the etchant getting into the display regions of the liquid crystal display element 18 through the inlets 23a, so that defective display attributable to infiltration of the etchant can be prevented securely. Thus, the resulting compact liquid crystal display element 18 is improved in display quality level.

The following is a description of a manufacturing method according to a second embodiment of the invention. The second embodiment differs from the first embodiment in that a part of the air vent narrowed in the sticking process is cut without forming any opening spacers so that the sealing agent can be sucked in more easily. Since the second embodiment shares other configurations with the first embodiment, like numerals are used to designate like portions of the two embodiments, and a repeated description of those portions is omitted.

Figure 5:
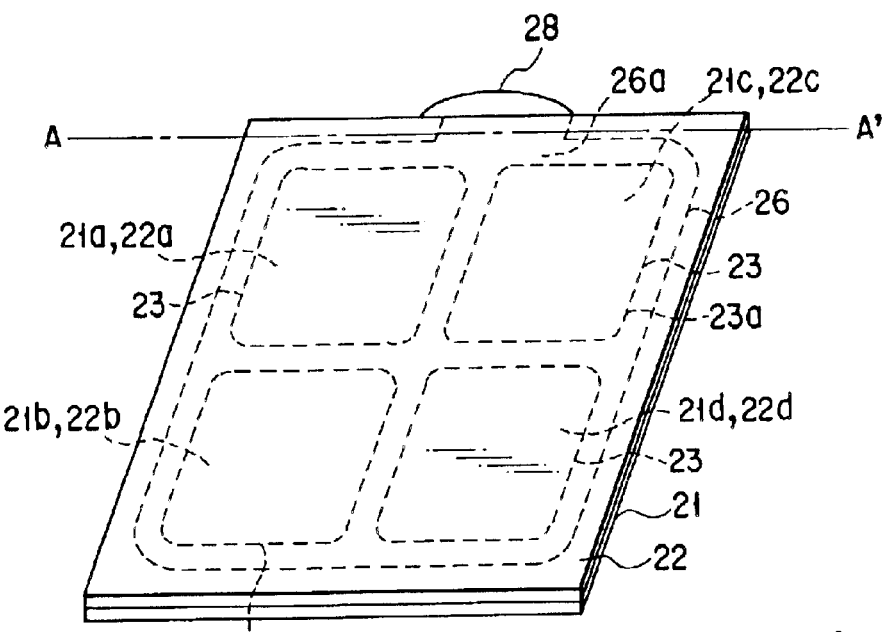
FIG. 5 is a perspective view showing two mother glasses stuck together in a manufacturing method according to a second embodiment of the invention.

In manufacturing the liquid crystal display element 18 according to the second embodiment, as shown in FIG. 5, the transfer agent is spread over the respective driving regions of the array substrate patterns 21a to 21d without forming opening spacers 27 in the air vent 26a after product seals 23 and the outer peripheral seal 26 are applied to the mother glass 21. Thereafter, the two mother glasses 21 and 22 are opposed to each other, and the product seals 23 and the outer peripheral seal 26 are cured to stick the two glasses together. Subsequently, the mother glasses 21 and 22 are pressurized to push out a surplus air pool between the glasses through the air vent 26a.

Figure 6:
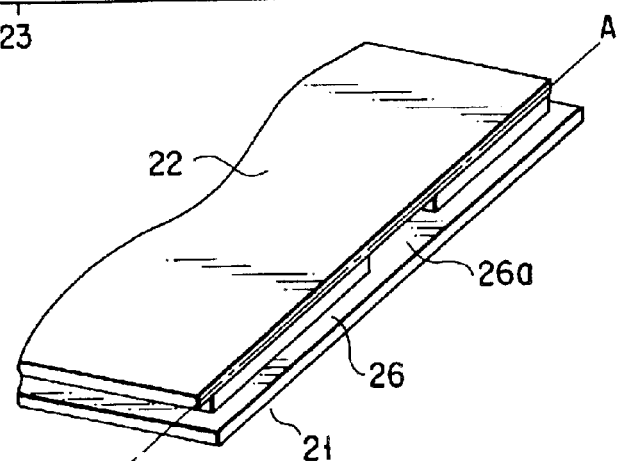
FIG. 6 is a perspective view showing one of the mother glasses having one side edge portion cut off in the manufacturing method of the second embodiment.
Figure 7:
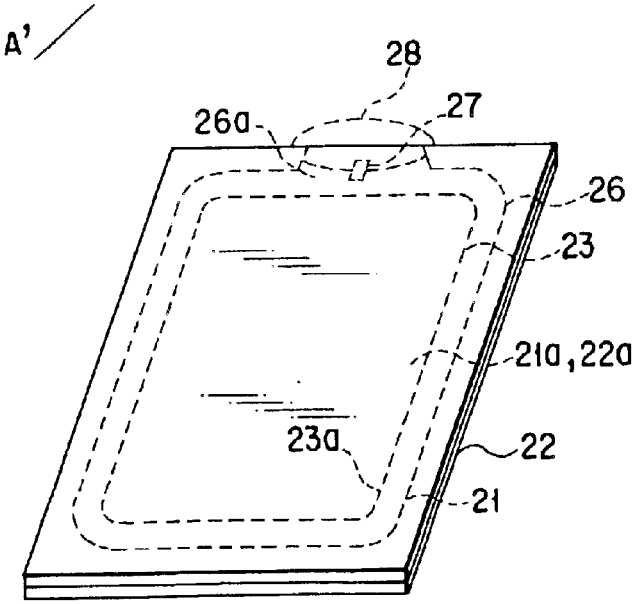
FIG. 7 is a perspective view showing two mother glasses stuck together in a manufacturing method according to a modification of the invention.

After the mother glasses 21 and 22 are stuck together and pressurized, at least one of them, e.g., the mother glass 22, is scribed along dotted line A–A' of FIGS. 5 and 6, which extends outside the outer peripheral seal 26 at a distance of about 1.0 mm from it, on the side where the air vent 26a is formed, whereupon one side edge portion of the mother glass 22 is cut. Thereupon, that region of the air vent 26a in which its gap is narrowed on the outer peripheral side of the mother glasses 21 and 22 is cut. Accordingly, that region of the air vent 26a which is situated near the region for the formation of the liquid crystal display element 18 and in which a wide gap is secured by means of the spacers 13 in the display regions is exposed. Thereafter, a sealing agent 28 is sucked into the air vent 26a to seal it in a manner such that the mother glasses 21 and 22 are held upright with the air vent 26a upward. Thereupon, the sealing agent 28 can be satisfactorily sucked in through the air vent 26a that secures the gap. Thus, the air vent 26a can be securely sealed with the sealing agent 28.

Subsequently, the two mother glasses 21 and 22 are equally polished to a thickness of about 0.5 mm each in the same manner as in the first embodiment, and are cut and divided into individual display cells.

According to the manufacturing method described above, the region of the air vent 26a with the wide gap can be exposed to allow the sealing agent 28 to be satisfactorily sucked into the vent 26a by cutting that region of the vent 26a in which its gap is narrowed in the sticking or air removing process. By doing this, the air vent 26a can be sealed securely. As in the case of the first embodiment, therefore, the etchant can be securely prevented from getting into the gap between the mother glasses 21 and 22 through the air vent 26a as the glasses 21 and 22 are polished to thin the glass substrates 11a and 12a. In consequence, the respective inner surfaces of the mother glasses 21 and 22 cannot be etched and cracked or chipped, so that the yield of production of the thin, lightweight liquid crystal display elements 18 can be improved. Further, the etchant can be securely prevented from getting into the display regions of the liquid crystal display element 18 through the inlets 23a, so that defective display attributable to the infiltration of the etchant can be prevented with reliability. Thus, the resulting compact liquid crystal display element 18 is improved in display quality level.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

For example, the construction of the liquid crystal display element and the like are optional, and the construction of a switching element, the number of dots of the matrix-shaped pixel electrode, etc. are not limited to the embodiment described above. Further, a color filter may be located on the opposite substrate side.

The size of each mother glass, the number of flat display elements formed on the mother glasses, etc. are optional. According to a modification of the manufacturing method shown in FIG. 6, for example, an array substrate pattern 21a and an opposite substrate pattern 22a are formed on mother glasses 21 and 22, respectively, and a product seal 23 and an outer peripheral seal 26 surrounding the same are formed on one of the mother glasses. At the same time, an opening spacer 27 is formed in an air vent 26a of the outer peripheral seal 26. Then, the two mother glasses 21 and 22 are stuck together with the product seal 23 and the outer peripheral seal 26 between them. After the mother glasses are pressurized to remove air, the sealing agent 28 is sucked into the air vent 26a to seal it. Then, the mother glasses 21 and 22 are cut between the product seal 23 and the outer peripheral seal 26 to form one display cell. Thereafter, the liquid crystal is injected through an inlet 23a of the product seal 23, and the inlet is sealed, whereupon the liquid crystal display element is completed.

The material and the conditions of formation of the opening spacer are optional, and only one spacer may be provided near the center of the air vent only if a wide gap can be secured for the air vent. The opening spacer may be formed by using a tacking agent for sticking the mother glasses together, besides the transfer agent. Further, the opening spacer may be formed as the transfer agent or tacking agent is spread, or may be independently formed of a quite different material.

The substrates may be polished by optional methods. For example, they may be mechanically polished under pressure by means of an abrasive, or if necessary, be chemically polished after they are mechanically polished. If a protective film or the like is formed on one of the substrates, for example, moreover, only the other substrate, which is exposed without being protected by a protective film, may be polished to thin the flat display element. Furthermore, the depth of polishing is not limited to the foregoing embodiment only if the strength of the substrates can be maintained.

According to the embodiment described herein, moreover, the liquid crystal is injected in a vacuum after the paired substrates are stuck together and polished. Alternatively, however, the substrates may be stuck together after the liquid crystal is injected by dropping into the regions surrounded by the product seals. In this case, the product seals require no inlets.

What is claimed is:

1. A method of manufacturing a flat display element, comprising:

preparing a pair of substrates;

forming an electrode pattern on each substrate;

forming on one of the substrates a product seal surrounding the electrode pattern and an outside seal having an air vent and surrounding the outside of the product seal;

forming a gap retaining member in a form of an island and configured to maintain a gap between the substrates in a region of the air vent outside the product seal and near the air vent, the gap retaining member being formed by applying a tacking agent to the substrates;

sticking the pair of substrates together with the product seal and the outside seal between the substrates after the gap retaining member is formed;

pressurizing the substrates after the substrates are stuck together;

sealing the air vent with a sealing agent after the air is discharged; and polishing an outer surface of at least one of the substrates after the air vent is sealed.

2. A method of manufacturing a flat display element according to claim 1, wherein the substrates are polished mechanically.

3. A method of manufacturing a flat display element according to claim 1, wherein the substrates are polished chemically.

4. A method of manufacturing a flat display element, comprising:

preparing a pair of substrates;

forming an electrode pattern on each substrate;

forming on one of the substrates a product seal surrounding the electrode pattern and an outside seal having an air vent and surrounding the outside of the product seal;

forming a means for maintaining a gap between the substrates in a region of the air vent outside the product seal and near the air vent, the gap retaining member being formed by applying a tacking agent to the substrates;

sticking the pair of substrates together with the product seal and the outside seal between the substrates after the means for maintaining a gap is formed;

pressurizing the substrates after the substrates are stuck together;

sealing the air vent with a sealing agent after the air is discharged; and polishing an outer surface of at least one of the substrates after the air vent is sealed.

5. A method of manufacturing a flat display element according to claim 4, wherein the substrates are polished mechanically.

6. A method of manufacturing a flat display element according to claim 4, wherein the substrates are polished chemically.

7. A method of manufacturing a flat display element, comprising:

preparing a pair of substrates;

forming an electrode pattern on each substrate;

forming on one of the substrates a product seal surrounding the electrode pattern and an outside seal having an air vent and surrounding the outside of the product seal;

forming a gap retaining member in a form of an island and configured to maintain a gap between the substrates in a region of the air vent outside the product seal and near the air vent, the gap retaining member being formed by applying a transfer agent to the substrate;

sticking the pair of substrates together with the product seal and the outside seal between the substrates after the gap retaining member is formed;

pressurizing the substrates after the substrates are stuck together;

sealing the air vent with a sealing agent after the air is discharged; and polishing an outer surface of at least one of the substrates after the air vent is sealed.

8. A method of manufacturing a flat display element, comprising:

preparing a pair of substrates;

forming an electrode pattern on each substrate;

forming on one of the substrates a product seal surrounding the electrode pattern and an outside seal having an air vent and surrounding the outside of the product seal;

forming a gap retaining member for maintaining a gap between the substrates in a region of the air vent outside the product seal and near the air vent, the gap retaining member being formed by applying a transfer agent to the substrates;

sticking the pair of substrates together with the product seal and the outside seal between the substrates after the gap retaining member is formed;

pressurizing the substrates after the substrates are stuck together;

sealing the air vent with a sealing agent after the air is discharged; and polishing an outer surface of at least one of the substrates after the air vent is sealed.

* * * * *